(No Model.)
H. C. LOWRIE.
FLEXIBLE COUPLING OR JOINT FOR WOODEN RODS.
No. 317,157. Patented May 5, 1885.
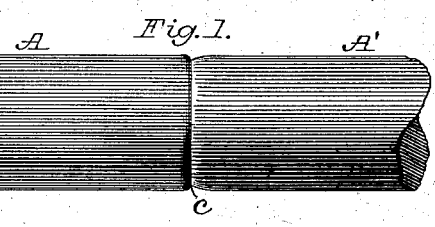
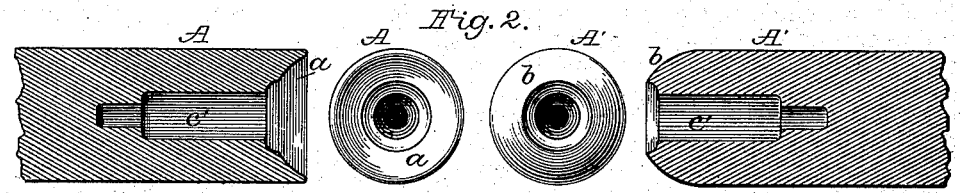
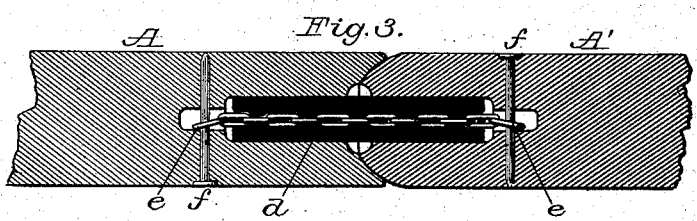
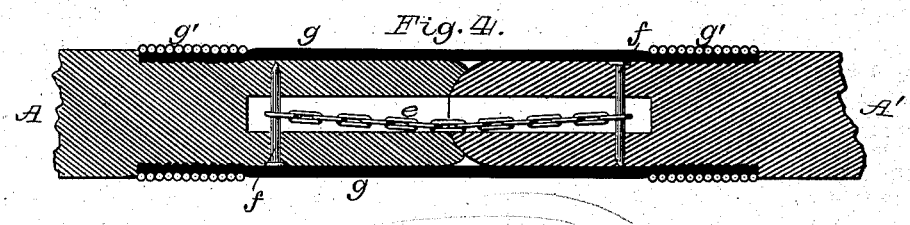
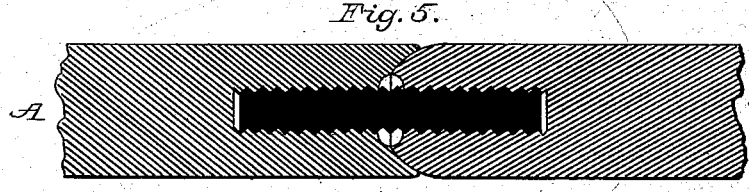
Attest: Philip F. Larner, Howell Battle.
Inventor: Harvey C. Lowrie, By Wm. C. Wood, Attorney.

UNITED STATES PATENT OFFICE.

HARVEY C. LOWRIE, OF DENVER, COLORADO.

FLEXIBLE COUPLING OR JOINT FOR WOODEN RODS.

SPECIFICATION forming part of Letters Patent No. 317,157, dated May 5, 1885.

Application filed September 20, 1884. (No model.)

*To all whom it may concern:*

Be it known that I, HARVEY C. LOWRIE, of Denver, in the county of Arapahoe and State of Colorado, have invented certain new and useful Improvements in Flexible Couplings or Joints for Wooden Rods, Staves, &c.; and I do hereby declare that the following specification, taken in connection with the drawings furnished and forming a part thereof, is a true, clear, and complete description of the several features of my invention.

The object I seek is to provide a flexible joint or coupling by which sections of a wooden rod or bar may be united so as to constitute a continuous length of rod, which for many purposes would be practically as useful as if integral, both as to thrusting and tensile strains, and yet be capable of being largely deflected from a right line in all directions.

Although my said improvements have been devised with special reference to their application to sectional rods adapted to clearing out small drain-pipes, they are also applicable to other rods and staves wherein flexibility and resiliency are desirable—for instance, in "billies," and in the handles of striking implements employed in various games where a quick, sharp, effective stroke is involved.

In one form my invention consists of the combination of two rod-sections, respectively provided with concavo-convex abutting ends and longitudinally chambered, with an elastic core of vulcanized rubber snugly housed in said sections, and, as an additional feature of value, a central metal flexible link or chain is located within said core and securely fastened at its ends to said rod-sections. With this entire combination the rubber core provides for flexibility and resiliency, and the link or chain being flexible, without impairing the peculiar powers of the core, provides against such longitudinal or tensile strains as the core might not successfully resist, and the close abutment of the concavo-convex ends provides against thrusting strains. In all cases where tensile strains are not liable to be encountered the link or chain may be omitted, if a heavy core be used, care being taken, however, to obtain the best possible adhesion between said core and the wooden sections—as, for instance, by having said core closely fitted and well charged with adhesive matter, and screw-threading the chamber. While it is preferable that the rubber be used internally as a core, it can be used externally in the form of a strong flexible tube without departure from certain portions of my invention.

To more particularly describe my invention, I will refer to the accompanying drawings, in which Figure 1 is a side view of a pair of rod-sections provided with my flexible joint or coupling. Fig. 2 is end and sectional views of the rod-sections at their joint. Fig. 3 is a central longitudinal section of Fig. 1. Fig. 4 is a central longitudinal section of a joint or coupling as constructed with the rubber applied in the form of a tubular sleeve. Fig. 5 is a central longitudinal section of a joint having the central core and no link or chain.

In each instance, A and A' denote wooden rod-sections having abutting ends which are concave, as at *a*, and convex, as at *b*, so that either can have a free swinging movement against the other without materially varying their contact. As shown in Figs. 2 to 5, inclusive, each rod-section is centrally chambered or bored longitudinally and inwardly from the concavo-convex joint, as at *c*.

In Fig. 3 my joint or coupling is shown in what I deem its best form. The chambers *c'* are snugly filled by a flexible and elastic coupling medium, preferably a vulcanized rubber core, *d*, of such proportions and of such character of rubber compound as will afford the desired strength and resiliency, which would of course be varied according to the particular uses intended. In many cases the core may be wholly relied upon for longitudinally uniting any two sections of wood, as in a rod, staff, or handle; but in that case I deem it advisable to internally roughen the chamber *c'*, or spirally score it, as seen in Fig. 5, and insert the rubber core well charged with adhesive matter, such as gum compound, which will harden, or with hot glue.

For resisting greater tensile strains than the rubber core would well be liable to withstand, I employ the central flexible link or series of links in the form of a chain, *e*, secured to the sections at each end by a lateral pin or screw, *f*. The best results will be obtained if the chain (or a flexible and non-extensible equivalent therefor, such as a small flexible rod or wire of proper dimensions and of suitable metal) be located within the core *d*, and in most cases the two should be combined, as by locating the chain in the gum compound prior to its vulcanization, and when so united the chain should not be fully extended.

As will be seen in Fig. 2, each rod-section chamber is chamfered or countersunk at its outer end, so as to obviate all liability of a cutting action upon the core during the flexion of the joint. If the core be not vulcanized upon its metallic center, heavy tubing composed in whole or in part of vulcanized rubber may be employed, although the solid core will generally be preferable. The chain or its flexible non-extensible equivalent must always be centrally located, and, as before indicated, be always a little slack, so as not to bind the concavo-convex surfaces into too close contact, although said surfaces should always be well finished and the wood well stuffed with hot paraffine, applied while the wood is heated.

With the centrally-located link or chain *e* the core may for many uses be dispensed with, and a resilient and flexible tube, *g*, be applied externally, so as to completely house the concavo-convex joint, as shown in Fig. 4. In this case the rod-sections are peripherally roughened and recessed to a depth equal to or a little greater than the thickness of the tube, and the latter at its ends should be clamped or secured by coiled wire *g'*, as shown. With this construction the edges of each section at the concavo-convex joint should be well rounded to obviate liability of cutting the tube during flexion, and in some cases it will be desirable to re-enforce the tube by means of a short section of similar tube chamfered at its ends, and applied so as to break or cover the joint at the ends of the rod-sections, and such re-enforcing collar may be outside of said main tube *g*, but preferably inside thereof.

Having thus described my invention, I claim as new and desire to secure by Letters Patent—

1. The combination, substantially as hereinbefore described, of the wooden sections provided with concavo-convex abutting ends, and a central flexible elastic core, securely housed in both of said rod-sections, and flexibly coupling them, as set forth.

2. The combination of the rod-sections, internally chambered centrally, and longitudinally connected by a non-extensible flexible link or chain, and a flexible, and elastic coupling, substantially as described.

3. The combination of the rod-sections, internally chambered at their abutting ends, a flexible and elastic core snugly fitted within said sections, and a flexible but non-extensible link or chain within said core, and firmly secured at its ends to said sections, substantially as described.

HARVEY C. LOWRIE.

Witnesses:
ANDREW RYAN,
J. S. LITTELL.